(12) United States Patent
Alfaro et al.

(10) Patent No.: US 10,686,740 B2
(45) Date of Patent: Jun. 16, 2020

(54) LEARNED USER PREFERENCE- AND BEHAVIOR-BASED NOTIFICATION FILTERING

(71) Applicant: Microsoft Technology Licensing, LLC, Redmond, WA (US)

(72) Inventors: Roberto Bojorquez Alfaro, Bothell, WA (US); Matus Lipka, Kirkland, WA (US); Lee Dicks Clark, Seattle, WA (US); Boaz Sapir, Givatayim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 394 days.

(21) Appl. No.: 15/261,740

(22) Filed: Sep. 9, 2016

(65) Prior Publication Data
US 2018/0077097 A1    Mar. 15, 2018

(51) Int. Cl.
*H04L 12/58* (2006.01)
*H04L 29/08* (2006.01)
*H04W 4/14* (2009.01)

(52) U.S. Cl.
CPC ............... *H04L 51/12* (2013.01); *H04L 51/16* (2013.01); *H04L 51/24* (2013.01); *H04L 67/22* (2013.01);
(Continued)

(58) Field of Classification Search
CPC ......... H04L 51/12; H04L 51/22; H04L 51/32; H04L 67/26; H04L 51/20; H04L 51/24;
(Continued)

(56) References Cited

U.S. PATENT DOCUMENTS 6,367,034 B1    4/2002    Novik et al.
6,751,657 B1    6/2004    Zothner
(Continued)

FOREIGN PATENT DOCUMENTS

WO    2012030989 A1    3/2012

OTHER PUBLICATIONS

"Toast Notification Filter (Industry 8.1)", Published on: Aug. 7, 2014 Available at: https://msdn.microsoft.com/en-us/library/dn449360(v=winembedded.82).aspx.
(Continued)

*Primary Examiner* — Soe Hlaing

(57) ABSTRACT

Techniques for learned user preference- and behavior-based notification filtering are described herein. In one or more implementations, notifications obtained from computer applications are filtered for presentation to a user. Example notifications include notifications about emails, text messages, phone calls, web-page specific messages, antivirus application messages, and so forth. As part of filtering the notifications, interactions of a user with the notifications and with events for which the notifications can be generated are monitored. The monitored interactions are used to learn user preferences and behaviors for notifications in different contexts of user interaction with computing devices. Data is collected that describes characteristics of a current context. Based on the current context, importance scores are computed for new notifications using the learned user preferences and behaviors. The importance scores can then be used to determine which of the new notifications to present to the user.

20 Claims, 8 Drawing Sheets

(52) U.S. Cl.
CPC ............ *H04L 67/26* (2013.01); *H04L 67/306* (2013.01); *H04L 51/32* (2013.01); *H04W 4/14* (2013.01)

(58) Field of Classification Search
CPC ....... H04L 67/306; H04L 67/22; H04L 51/16; H04W 4/14
See application file for complete search history.

(56) References Cited

U.S. PATENT DOCUMENTS

| | | | |
|---|---|---|---|
| 6,965,886 | B2 | 11/2005 | Govrin et al. |
| 7,603,427 | B1* | 10/2009 | Horvitz ................. G06Q 10/107 709/207 |
| 8,756,500 | B2 | 6/2014 | Harris et al. |
| 9,083,767 | B2 | 7/2015 | Tseng |
| 9,147,001 | B1 | 9/2015 | Brewington et al. |
| 2004/0205142 | A1 | 10/2004 | Bahr |
| 2010/0042470 | A1 | 2/2010 | Chang et al. |
| 2010/0070607 | A1 | 3/2010 | Khan et al. |
| 2012/0149342 | A1* | 6/2012 | Cohen ..................... H04L 51/24 455/412.2 |
| 2013/0212599 | A1 | 8/2013 | Giampaolo et al. |
| 2013/0241918 | A1* | 9/2013 | Satyan ..................... G06F 9/542 345/418 |
| 2013/0328665 | A1 | 12/2013 | Cranfill et al. |
| 2014/0188970 | A1* | 7/2014 | Madhok .................. H04L 67/04 709/201 |
| 2014/0195620 | A1 | 7/2014 | Srinivasan et al. |
| 2014/0229880 | A1* | 8/2014 | Aradhye .............. G06Q 10/107 715/771 |
| 2014/0237042 | A1* | 8/2014 | Ahmed ................... H04L 67/02 709/204 |
| 2014/0289384 | A1 | 9/2014 | Kao et al. |
| 2014/0372525 | A1 | 12/2014 | Raghavan et al. |
| 2015/0288642 | A1 | 10/2015 | Khoury |

OTHER PUBLICATIONS

Tol, Mark Van Der, "Using the Notification Filter to increase relevance", Published on: Feb. 12, 2014 Available at: http://www.plotprojects.com/using-the-notification-filter-to-increase-relevance/.

Klosowski, Thorin, "AnyReminder Adds a "Remind Me Later" Option to the iPhone's Mail, Messages, and Notifications", Published on: Mar. 18, 2013, Available at: http://lifehacker.com/5991059/anyreminder-adds-a-remind-me-later-option-to-the-iphones-mail-messages-and-notifications.

Ravenscraft, Eric, "Pushbullet Now Syncs All Your Notifications Across any Android Device", Published on: May 22, 2014, Available at: http://lifehacker.com/pushbullet-now-syncs-all-your-notifications-across-any-1580214771.

Betters, Elyse, "Facebook's Notify notification app: What is it and how does it work?", Published on: Nov. 11, 2015, Available at: http://www.pocket-lint.com/news/135886-facebook-s-notify-notification-app-what-is-it-and-how-does-it-work.

Zibreg, Christian, "Google+ notifications will soon sync across devices", Published on: Jun. 13, 2013, Available at: http://www.idownloadblog.com/2013/06/13/google-notifications-will-soon-sync-across-devices/.

Waghmare, Vibhusan, "Needed—"Remind Me Later" Option for Push Notifications from Apps", Published on: Dec. 11, 2015, Available at: http://www.vibhushan.com/remind-me-later-option-for-push-notifications/.

Owens, Steven, "The Sweet Setup", Published on: Jun. 2, 2015, Available at: http://thesweetsetup.com/apps/favorite-app-shared-lists/.

"Yoctoville", Published on: Jan. 28, 2013, Available at: http://yoctoville.com/alarmed-faq-cool-stuff-tips/.

V, Chandrashekhar, "Quick Reply from Lockscreen in iOS 8: A Complete Guide", Published on: Nov. 8, 2014, Available at: http://www.igeeksblog.com/quick-reply-from-lockscreen-on-iphone-and-ipad/.

Curtis, Sophie, "WhatsApp introduces 'mark as unread' feature", Published on: Jul. 23, 2015, Available at: http://www.telegraph.co.uk/technology/social-media/11757768/WhatsApp-introduces-mark-as-unread-feature.html.

"iOS Developer Library", Published on: Oct. 20, 2014, Available at: https://developer.apple.com/library/ios/documentation/UserExperience/Conceptual/MobileHIG/NotificationCenter.html.

* cited by examiner

LEARNED USER PREFERENCE- AND BEHAVIOR-BASED NOTIFICATION FILTERING

BACKGROUND

Computing devices present notifications to users for a variety of different purposes, such as to provide users with information, announce events, warn about impending situations, and so forth. At least some of these notifications may be generated initially by a corresponding application to deliver information managed by the application. By way of example, an email application of a mobile device can generate a pop-up message for display on an interface of the mobile device when a new email is received, e.g., on lock screen or home screen. Notifications may also be generated for other sources capable of providing information to or that support functionality of the computing device. For instance, notifications may be generated for short message service (SMS) messages, phone calls, voicemails, social-networking service events, and so on. Due to the increasing number of these sources and applications, the number of notifications handled by computing devices has also increased. The number of notifications has increased so greatly though, that it is impractical for most users to act on each of the notifications. The sheer number of notifications may cause users to simply ignore or delete many notifications without fully considering the information contained in them. Consequently, users can miss important information.

Some conventional techniques allow users to turn notifications on and off for a particular application or a particular service. By way of example, a settings interface of a mobile device may allow a user turn notifications on or off for a social networking application on the mobile device. The social network may also allow users to access privacy settings to turn certain notifications associated with the social network on or off, e.g., via a profile page of the social network. Determining which notifications to turn on and turn off, in order to customize which notifications to be shown and which notifications not to be shown, can be cumbersome for a user. As a result, users may not fully develop notification delivery settings to accurately reflect their ideal notification delivery preferences. Accordingly, conventional techniques may present users with notifications they would prefer not to be shown and may not present users with notifications they would prefer to be shown. Due to this, users can become annoyed with notifications presented by computing devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for learned user preference- and behavior-based notification filtering are described herein. In one or more implementations, notifications obtained from computer applications are filtered for presentation to a user. Example notifications include notifications about emails, text messages, phone calls, web-page specific messages, antivirus application messages, and so forth. As part of filtering the notifications, interactions of a user with the notifications and with events for which the notifications can be generated are monitored. The monitored interactions are used to learn user preferences and behaviors for notifications in different contexts of user interaction with computing devices, such as when the user is at work and checking email on an associated mobile device or when the user is at home browsing the web on the mobile device. The techniques described herein collect data describing characteristics of a current context. Based on the current context, importance scores for new notifications generated by the applications are computed using the learned user preferences and behaviors. The importance scores can then be used to determine which of the new notifications to present to the user. Digital content such as a notification view is generated to present the determined new notifications to the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
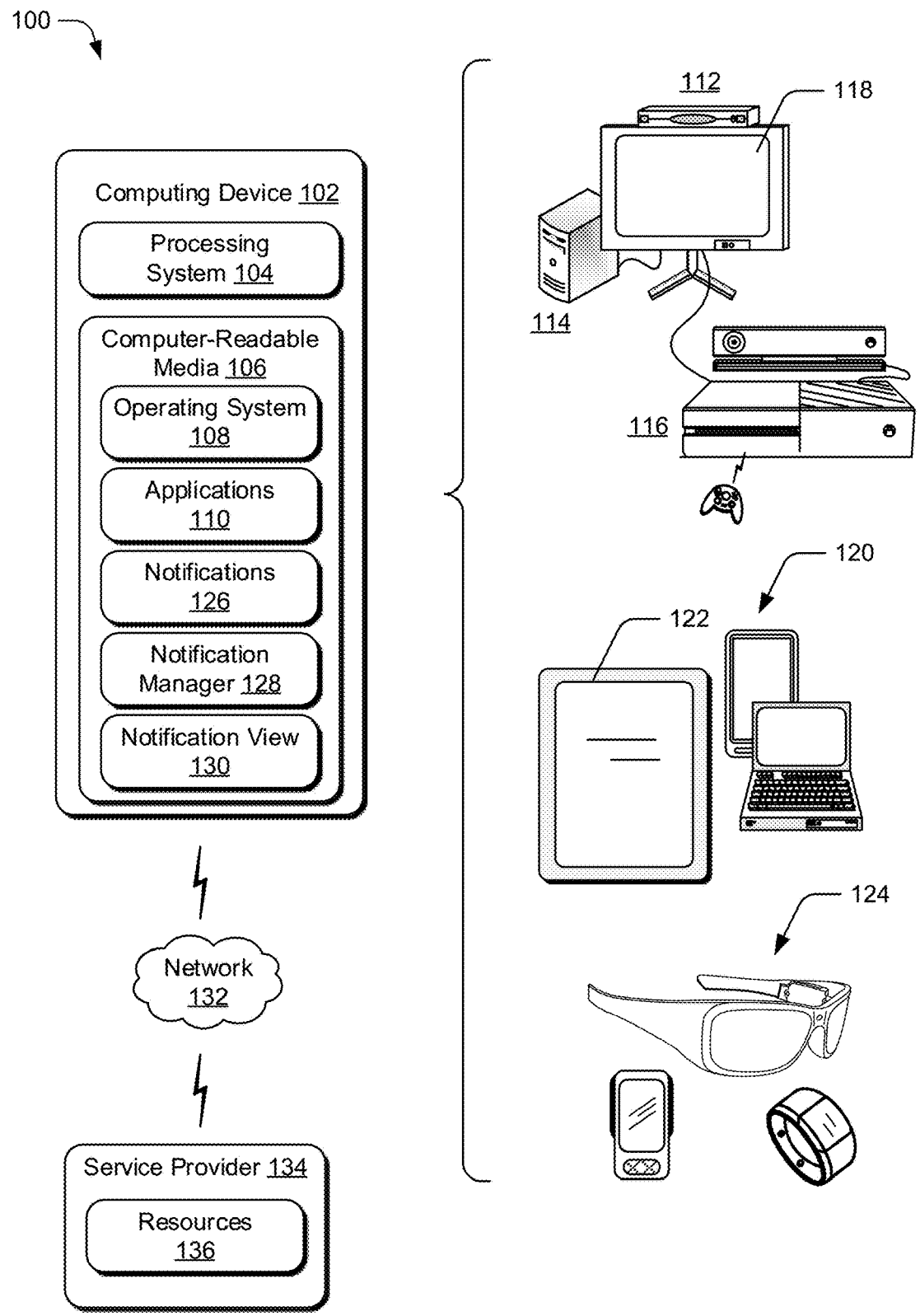
FIG. 1 is an illustration of an environment in an example implementation that is operable to employ techniques described herein.

The number of notifications computing devices are tasked with managing continues to increase. This coincides with the increased number of applications executing on and services accessible via computing devices publishing notifications. In addition, many such applications and services continue to deliver increasing functionality about which notifications can be provided. The number of notifications has increased so greatly that it is impractical for most users to act on each of the notifications. Instead, users may simply ignore or delete many notifications without fully considering the information contained in them. Consequently, users can miss important information. Additionally, conventional techniques that enable notification filtering can involve a significant amount of valuable time on the part of the user—in connection with capturing the user's notification delivery preferences. Even when users are willing to spend the time to develop their notification delivery settings, conventional techniques may not allow users to adjust these settings in a way that completely reflects their ideal notification delivery preferences. Consequently, conventional techniques may present users with notifications they would prefer not to be shown and may not present users with notifications they would prefer to be shown.

Techniques for learned user preference- and behavior-based notification filtering are described herein. In one or more implementations, notifications obtained from different applications and services are filtered to present important notifications to a user based on a current context of the user. A subset of the notifications obtained are determined "important" based on learned user preferences and behaviors regarding notifications in different contexts. User preferences may be learned, for instance, by monitoring a user's actions when they are presented with a type of notification, e.g., by tracking whether the user opens a notification, hides the notification, deletes the notification, and so forth. User behaviors may be learned by monitoring a user's actions performed relative to events for which notifications can be generated. For instance, the described techniques can learn that a user checks work email at certain times of the day (e.g., 9:00 AM to 5:00 PM) but not at other times. From this the techniques can infer that the user may wish to be notified about work emails (e.g., with pop-ups or some other notification mechanism) at those certain times of the day, but not at the other times.

As part of learning the preferences and behaviors, the techniques may thus consider several different characteristics of a context in which the user performs notification-relevant actions. By way of example, when a user performs notification-relevant actions, data may be captured that describes a current action or history of just-performed actions, a location of the user, a calendar of the user, a payload of a notification under consideration, engagement of the user with instrumentation of a corresponding computing device, ranked preferences of the user, a communication history of the user, a current device of the user, and so forth. By capturing this information, the techniques learn the actions users perform relative to notifications and events for which notifications can be generated in different contexts.

This information can be used to determine which notifications are important in different contexts—notifications of a type the user has interacted with positively (e.g., selected, opened, and read) in previously encountered contexts, notifications for types of interactions the user has demonstrated interest in the previously encountered contexts, and so forth. Thus, given a current context, a determination can be made as to whether notifications are important. Based on this determination, the important notifications can then be presented.

As mentioned, the determination as to whether notifications are important is based on a current context of a user. Accordingly, the described techniques also involve determining the current context of the user. To do so, data describing the above noted context characteristics (e.g., the current action or history of just performed actions, and the location of the user) is captured for the current context. These characteristics captured for the current context can be compared to the characteristics captured for previously encountered contexts, to determine similar contexts. Notification-related actions taken by the user in previously encountered similar contexts can then be used to inform the techniques regarding which notifications the user may consider important in the current context.

In one or more implementations, users may be presented notifications about communications from a variety of different sources, e.g., notifications about SMS text messages, social networking events, phone calls, emails, and so on. Unlike conventional techniques, the techniques described herein allow users to flag each of these notifications—users are not limited to merely flagging notifications about emails. A user can flag notifications about text messages, for instance. The flagged notifications can then be presented in a notification view until the user unflags them. Further, the flagged notifications can be presented in a position of prominence relative to other notifications in the notification view.

By limiting the notifications presented to those that are important to users in a given context, users may be inclined to fully consider and act on a greater number of presented notifications (or act on a same number of notifications, but act on more important notifications) compared to conventional techniques. Presenting notifications in accordance with the techniques described herein can also cause users to be less annoyed with the notifications that are presented. Further, user experiences with computing devices that employ the techniques described herein can be improved as a result of the improved interactions and reduced annoyance with notifications.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the examples procedures and details.

Example Environment

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, and fixed logic devices), one or more computer-readable media 106, an operating system 108, and one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from the applications 110 to provide a wide range of functionality to the computing device 102, including but not limited to gaming, office productivity, email, media management, printing, networking, web-browsing, and so forth. A variety of data and program files related to the applications 110 can also be included, examples of which include game files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, and glasses), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of the wearable devices 124 depicted in FIG. 1 include glasses, a smart band or watch, and a pod device such as clip-on fitness device, media player, or tracker. Other examples of wearable devices 124 include a badge, a key fob, an access card, a ring, an article of clothing, a glove, and a bracelet. Any of the computing devices can be implemented with various components, such as one or more processors and memory devices, as well as with any combination of differing components. One example of a computing system that can represent various systems and/or devices including the computing device 102 is shown and described below in relation to FIG. 8.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 8.

The computing device 102 is also illustrated with notifications 126 and notification manager 128. The notification manager 128 represents functionality operable to manage the notifications 126 for the computing device 102 in various ways. In general, the notifications 126 are generated by the applications 110 to provide a user of the computing device 102 with information, announce events, warn about impending situations, and so forth. By way of example, a notification from an email application can be provided to inform the user that a new email has been received, a notification from a social network service can announce that a friend of the user posted a picture to the social network service, a notification from a power management application of the computing device 102 can warn the user that a battery level is low, and so forth. The notifications 126 can be generated by the applications 110, the operating system 108, and other sources (such as due to receiving a short message service (SMS) text message) without departing from the spirit or scope of the techniques describe herein. Regardless of an entity responsible for generating the notifications 126, they are published for use by the operating system 108, which involves maintaining the notifications at least temporarily. The operating system 108 can include storage for holding published notifications as described in relation to FIGS. 2 and 3.

The notification manager 128 manages the notifications 126 at the operating system 108 level. In other words, the notification manager 128 interacts with the operating system 108 to obtain notifications for processing. This allows the notification manager 128 to obtain notifications without interfacing directly with the applications 110. An advantage of obtaining the notifications 126 from the operating system 108, rather than directly from the applications 110, is that the described techniques can be implemented without using a new application programming interface (API), e.g., an API for third party application developers to ingest notifications into the system. Instead, the notification manager 128 can simply handle the notifications 126 published to the operating system 108. Accordingly, the burden on developers to change their application code to enable the notification filtering described above and below can be eliminated or at least reduced.

Broadly speaking, the notification manager 128 learns preferences and behaviors of a user for notifications in different contexts, determines a current context, determines which of the notifications 126 are important to the user given the context, and generates notification view 130 to present the important notifications. Learning a user's notification-relevant preferences and behaviors in different contexts as well as determining a current context involves collecting data indicative of the context. By way of example, the notification manager 128 may collect data indicative of an action performed by the user, a history of actions performed by the user, a location of the user, a calendar of the user, a payload of a notification under consideration, engagement of the user with instrumentation of the computing device, ranked preferences of the user, a communication history of the user, other devices associated with the user, and so forth.

When learning the user's preferences and behaviors, the notification manager 128 can associate the collected context data with the preferences and behaviors of the user. Consider an example in which the collected data includes calendar data indicating the user is at work, device data identifying the device the user is interacting with as the user's mobile device, and activity data indicating the user is interacting with an email application of the mobile device. In this example, assume that the user receives a phone call on the mobile device from a friend and ignores the call. Assume also that the user receives a text message on the mobile device from his/her spouse and responds with a reply text message. The notification manager 128 can thus associate the behavior of the user to ignore calls from friends with a context in which the user is at work and checking email on the user's mobile device. The notification manager 128 can also associate the behavior of the user to respond to text messages from his/her spouse with that context. Based on these behaviors, the notification manager 128 can learn that calls from the user's friend are less important to the user than texts from the user's spouse when the user is at work and checking email on the user's mobile device. This is but one simple example of the preferences and behaviors the notification manager 128 is capable of learning to inform which notifications to present in similar contexts encountered in the future.

When determining the user's current context, the notification manager 128 can compare the collected data to previously encountered contexts to determine similar contexts. Consider a different example that occurs at a later time than the example discussed just above in which the collected data again includes calendar data indicating the user is at work, device data identifying the device the user is interacting with as the user's mobile device, and activity data indicating the user is interacting with an email application of the mobile device. The notification manager 128 is capable of determining that the context of this different later example is similar to the context of the above described example. Due to the similar contexts, the notification manager 128 is capable of applying the preferences learned in the above described example to this different later example. If the user is called by the friend and texted by his/her spouse again in this later example, for instance, the notification manager 128 may determine that the text from the spouse is more important than the call from the friend. Based on this, the notification manager 128 can configure the notification view 130 to include a notification for the spouse's text message but not a notification for the friend's call.

To determine which of the notifications 126 to include in the notification view 130, the notification manager 128 is configured to compute importance scores for the notifications 126 based on the current context. The notification manager 128 may generate the notification view 130 to include the notifications with importance scores above a predefined threshold importance, the top-x scoring notifications (where x is a number of notifications that fits within the notification view), and so on. In a scenario in which notifications from different applications or sources have varying sizes or are configured differently, the notification manager 128 may rank the notifications based on the importance scores, insert a highest ranked notification into the notification view 130, and continue inserting the notifications into the notification view 130 until there is not room for a next ranked notification.

The notification manager 128 also represents functionality to generate the notification view 130 for presentation to a user. By way of example, the notification manager 128 may generate a graphical user interface for display via a display of the computing device 102. Although the notifications are described as being presented in a "view" such as the notification view 130. The notification manager 128 may be configured to cause important notifications to be presented in other ways, such as audibly for the user to hear, without departing from the spirit or scope of the techniques described herein. Furthermore, the notification manager 128 may update the notification view 130 based on the occurrence of different events. For instance, the notification manager 128 may be configured to generate the notification view 130 (e.g., including determining a current context and notifications to present based on the context) at predetermined intervals (e.g., every minute, every 5 minutes, every 30 minutes), based on a user selection to present the notification view 130, when a triggering event occurs (e.g., the user closes a gaming application that takes up a full screen, or receives a call from his/her spouse), and so on.

The environment 100 further depicts that the computing device 102 may be communicatively coupled via a network 132 to a service provider 134, which enables the computing device 102 to access and interact with various resources 136 made available by the service provider 134. The resources 136 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations.

Learned User Preference- and Behavior-Based Notification Filtering

Figure 2:
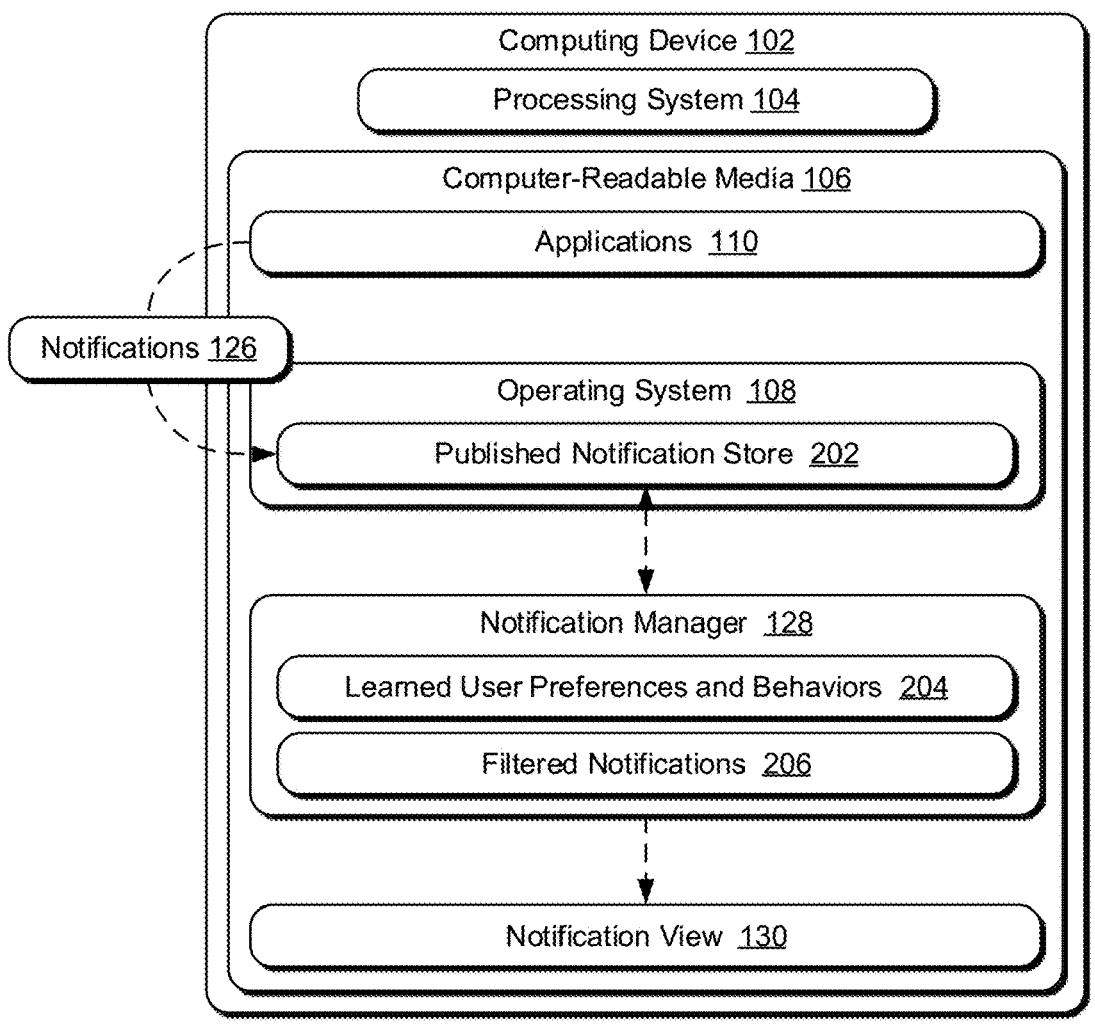
FIG. 2 is a diagram depicting an example configuration of a notification manager in accordance with one or more implementations.
Figure 2:
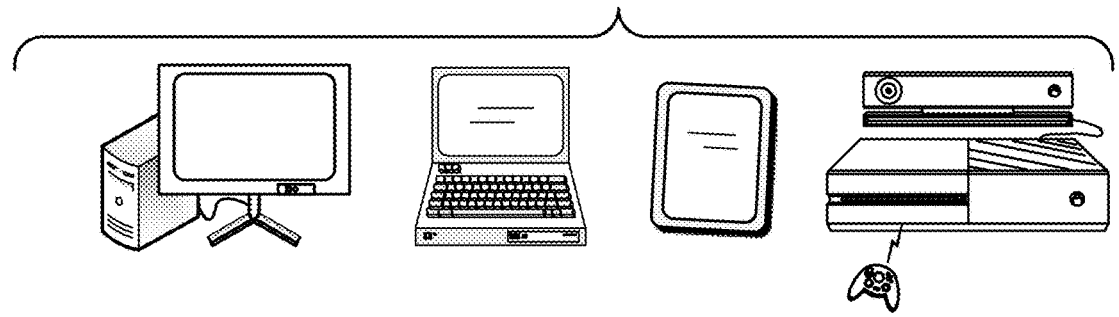

To further illustrate, consider the discussion in this section of example devices, components, user interfaces, and procedures that may be utilized to filter notifications based on learned user preferences and behaviors. In general, functionality, features, and concepts described in relation to the examples above and below may be employed in the context of the example procedures described below. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description Example Devices FIG. 2 depicts generally at 200 example details of a computing device 102 having a notification manager 128 in accordance with one or more implementations. The computing device 102 also includes processing system 104, computer readable media 106, operating system 108, and applications as discussed in relation to FIG. 1. In this context, the operating system 108 is depicted having published notification store 202 and the notification manager 128 is depicted having learned user preferences and behaviors 204 and filtered notifications 206.

As mentioned above, the techniques described herein may be implemented without requiring the applications 110 to interface with a new application programming interface (API). Instead, the notification manager 128 generates the notification view 130 using notifications that are published by the applications 110 to the operating system 108. This example depicts the applications 110 publishing the notifications 126 to the operating system 108. The published notification store 202 represents functionality of the operating system 108 to maintain the published notifications at least temporarily in storage. The published notification store 202 may be configured to hold the notifications 126 published to the operating system 108 until they can be processed by the notification manager 128. Once processed, the notification manager 128 may cause the processed notifications to be removed from the published notification store 202, moved to a different storage location (e.g., when a particular notification is saved for later presentation), placed back in the published notification store 202 (e.g., to be processed again at a later time), and so on.

In any case, the published notification store 202 represents functionality to maintain each of the notifications published to the operating system 108, and is accessible by the notification manager 128 to process those notifications. In one or more implementations, the published notification store 202 may be located remotely from the computing device 102—the published notification store 202 may be located at a service provider 134 so that notification managers 128 on different computing devices associated with a user can access the published notifications. This can enable notification filtering based on learned user preferences and behaviors to be carried out across multiple devices associated with a user.

In FIG. 2, the notification manager 128 is depicted having access to the published notification store 202. In one or more implementations, the notification manager 128 accesses the published notifications by requesting them from the published notification store 202. Alternately or in addition, the operating system 108 (or other component if the store is located remotely) pushes notifications from the published notification store 202 to the notification manager 128.

The notification manager 128 is capable of using the notifications 126 to learn user preferences and behaviors relevant to presenting notifications to a user. The learned user preferences and behaviors 204 represent the preferences and behaviors the notification manager 128 learns for notifying a user, such as not to present the user a notification for work-related emails while the user is on vacation, but to present the user a notification when his/her spouse texts while the user is at work, and so on. To learn the user preferences and behaviors, the notification manager 128 may utilize a variety of machine learning techniques, such as neural networks, clustering, Bayesian networks, and so on. In connection with learning a user's notification preferences (e.g., that the user prefers not to receive work emails while on vacation) and behaviors (e.g., that the user responds to texts from his/her spouse), the notification manager 128 also captures data describing a current context of the user as described above. It should be noted that the notification manager 128 may capture a variety of data describing a current context without departing from the spirit or scope of the techniques described herein.

When the notification manager 128 observes a notification related behavior of the user (e.g., opening a notification, deleting a notification, or ignoring a notification), the notification manager 128 can associate the observed behavior with the data captured to describe the context. The notification manager 128 can apply machine learning techniques to the observed behaviors and captured context data to learn a user's preferences for notifications in different contexts. Once learned, the notification manager 128 can apply the learned user preferences and behaviors 204 to filter notifications.

The filtered notifications 206 represent the notifications that the notification manager 128 has determined are important to a user in a current context, and are to be presented to the user via the notification view 130. In particular, the notification manager 128 generates the notification view 130 to include the filtered notifications 206. To determine which of the notifications 126 correspond to the filtered notifications 206, the notification manager 128 may score each of the notifications 126. The scores are indicative of an importance of a given notification in the current context. Further, the scores are relative so that the notifications can be compared, e.g., the notifications can be compared one to another to determine more and less important notifications. The scores are also context dependent, such that in different contexts a particular notification may be assigned a different importance score. By way of example, a notification that notifies the user of a work email may have a more favorable importance score during work hours and when the user is determined to be at work than during non-working hours and when the user is determined to be at home.

The notification manager 128 also determines a current context in connection with computing the importance scores of the notifications 126. To do so, the notification manager 128 captures the data describing the current context. With this information the notification manager 128 can determine user contexts such as at work, at home, an active project, important people, and so forth. The notification manager 128 can use the collected context data to describe contexts in further levels of detail rather than simply 'at work' or 'at home'.

Regardless of the level of detail in which a current context is described, the notification manager 128 computes the importance scores relative to the current context. By way of example, the notification manager 128 may ascertain which of the learned user preferences and behaviors 204 correspond to a same or similar context (e.g., contexts with similar characteristics) as the current context. Further, the notification manager 128 may use the learned user preferences and behaviors 204 associated with the similar, previously encountered contexts to predict the importance of the notifications 126 in the current context, e.g., using machine learning. The importance scores computed for the notifications in the current context thus reflect the learned user preferences and behaviors 204 for the similar, previously encountered contexts.

Furthermore, the notification manager 128 may use the importance scores in a variety of ways to identify the filtered notifications 206 from the notifications 126. By way of example, the notification manager 128 may select the top-x scoring notifications, where 'x' is some predetermined number, such as a number of notifications that will fit for presentation in the notification view. The notification manager 128 may also identify the filtered notifications 206 as the notifications having an importance score greater than a threshold score. When the filtered notifications 206 are identified using a threshold, the notification manager 128 may select filtered notifications for inclusion in the notification view 130 in ways other than taking the top scoring notifications. For example, the notification manager 128 may select the filtered notifications 206 that can be arranged in the notification view in a most visually pleasing manner, top scoring notifications of multiple different types (e.g., top scoring calendar-related notification, top scoring missed call notification, top scoring text message notification), and so on.

The notification manager 128 then generates the notification view 130 to present the filtered notifications 206. By way of example, the notification manager 128 is capable of generating the notification view as a graphical user interface component as described in relation to FIGS. 4 and 5. Broadly speaking, the notification view 130 is configured to present the filtered notifications 206 to a user. When configured as a graphical user interface, for instance, the notification view 130 is displayable by a display device to visually present notifications to a user. The notification view 130 is not limited to graphical presentations, however. In one or more implementations, the notification manager 128 may generate an audio presentation of the notifications, that can be played via speakers of the computing device 102 and audibly present the notifications to a user. The filtered notifications 206 may be presented in other ways without departing from the spirit or scope of the techniques described herein.

In addition to presenting notifications to the user, the techniques described herein also allow the user to interact with presented notifications. By way of example, the notifications presented in the notification view 130 may also be presented with additional components that allow the user to respond to the notification. Users may interact with the notifications of the notification view 130 by deleting and flagging notifications for instance. Flagging a notification can indicate the user has interest in the event for which the notification is generated. A user may flag a notification to mark the notification for some follow up action, such as to respond to a corresponding message, add an event to a calendar, complete a related task, and so forth.

Figure 3:
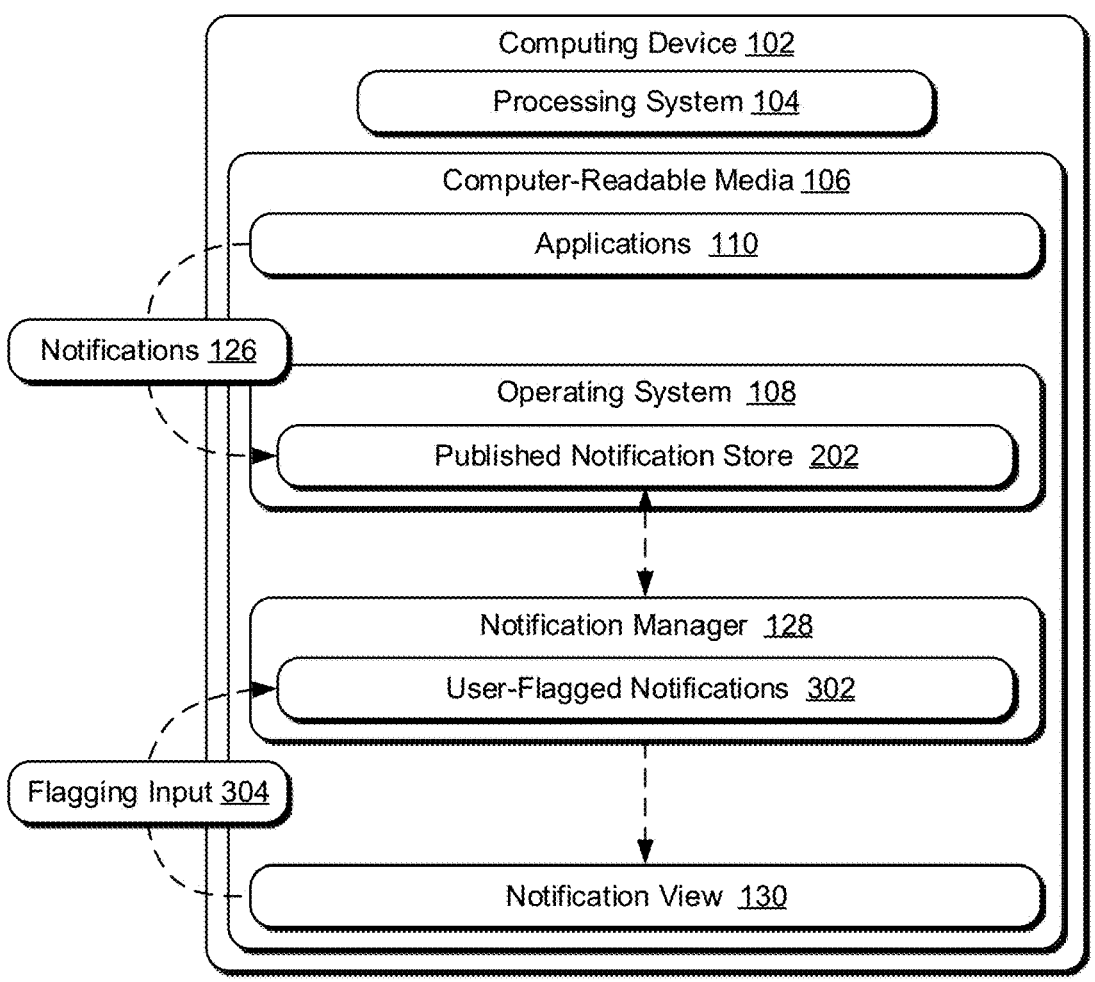
FIG. 3 is a diagram depicting another example configuration of the notification manager in accordance with one or more implementations.
Figure 3:
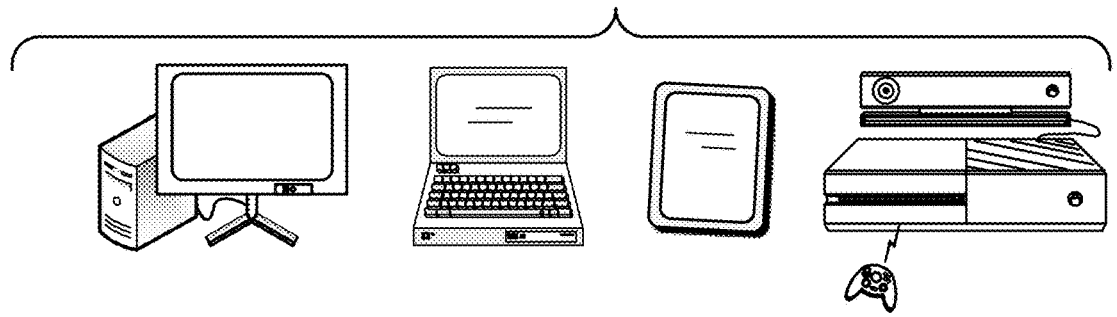

In this context, FIG. 3 depicts generally at 300 example details of a computing device having a notification manager 128 in accordance with one or more implementations. In contrast to FIG. 2, the notification manager 128 depicted in FIG. 3 includes user-flagged notifications 302. Also depicted in FIG. 2 is flagging input 304. The flagging input 304 represents user input received to flag one or more notifications presented via the notification view 130. The user-flagged notifications 302 represent the notifications corresponding to the flagging input 304. The flagging input 304 may be received relative to notifications presented as described in FIG. 2, for instance. Thus, the notification manager 128 in this example may also include the learned user preferences and behaviors 204 and the filtered notifications 206, although not depicted.

Additionally, the notification manager 128 represents functionality to generate the notification view 130 to include the user-flagged notifications 302. In one or more implementations, the notification view 130 as generated not only includes the filtered notifications 206, but also includes the user-flagged notifications 302. The user-flagged notifications 302 may be presented with prominence in the notification view 130. The user-flagged notifications 302 may be positioned at a top of the notification view for instance. Alternatively or in addition, the user-flagged notifications 302 may be visually emphasized in other ways, such as by presenting them with one or more of distinct fonts, eye-catching icons, different colors than other notifications, animations, and so forth.

The notification manager 128 may configure the notification view 130 to include the user-flagged notifications 302 until the notifications become unflagged. Thus, as long as a notification remains flagged, the notification manager 128 may include the notification in the notification view 130. Notifications may become unflagged in a variety of different ways, for instance, a user may unflag a notification (e.g., when the user has processed the notification), a flag may expire after a certain time period, and so on. Unlike conventional techniques, the described techniques allow users to flag notifications for different types of communications. In particular, the flagging input 304 is not limited to flagging email notifications. Instead, the flagging input 304 can be used to flag notifications for SMS text messages, notifications for social network service events (e.g., likes, shares, and comments), web-page specific events (e.g., an alert about a sporting event from a sporting news web site), notifications for antivirus software, and so forth. The flagging input 304 can be used to flag notifications from other sources without departing from the spirit or scope of the techniques described herein.

Example User Interfaces

Figure 4:
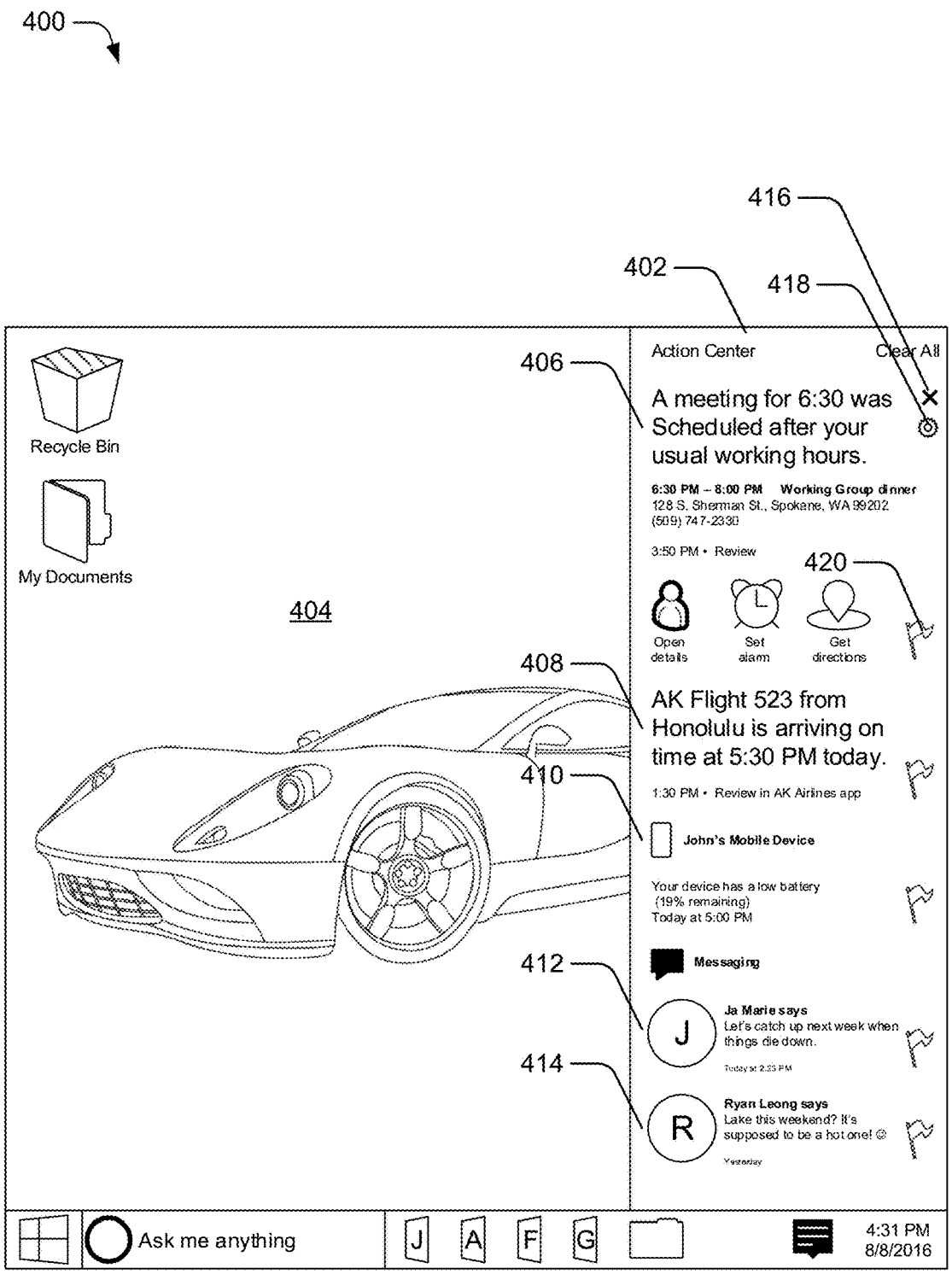
FIG. 4 illustrates an example user interface with a notification view in which notifications are filtered based on learned user preferences and behaviors in accordance with one or more implementations.

FIG. 4 depicts an example generally at 400 of a user interface with a notification view configured to present notifications that are filtered based on learned user preferences and behaviors. The user interface is depicted as having action center 402 which corresponds to the notification view 130. The action center 402 is illustrated overlaying home screen 404. The home screen 404 may be a root screen of the operating system 108 from which a user can begin navigation to access functionality of the computing device 102. Although depicted over the home screen 404, the action center 402 may be presented over other screens without departing from the spirit or scope of the techniques described herein. By way of example, the action center 402 may be presented over a lock screen displayed by the computing device 102, over a graphical user interface of one of the applications 110, over a presentation of streaming content, over a presentation of a game being played, and so forth.

The action center 402 is depicted with a variety of different notifications. In particular, the action center 402 includes calendar discrepancy notification 406, flight reminder notification 408, battery level warning notification 410, and instant messaging notifications 412, 414. The calendar discrepancy notification 406 may be generated by a calendar application. The flight reminder notification 408 may also be generated by the calendar application or may be generated by an airline-specific application. The battery level warning notification 410 may be generated by a device services application, the operating system 108, a battery monitoring application, and so forth. The instant messaging notifications 412, 414 may be generated by an instant messaging application.

Inclusion of these notifications in the action center 402 indicates that the notification manager 128 determined them to be more important than other notifications given a current context. In other words, the notifications depicted in the action center 402 are determined using the learned user preferences and behaviors 204 and correspond to the filtered notifications 206.

The notifications presented in the action center 402 may also be presented with components for responding to the notifications. The calendar discrepancy notification 406 is depicted with options to 'Open details', 'Set alarm', and 'Get directions' along with a dismiss icon 416 and a settings icon 418. The presented notifications may also include some mechanism that allows the user to flag those notifications. Flag 420 may correspond to the calendar discrepancy notification 406, for instance, and be selectable by a user to flag the calendar discrepancy notification 406. If the flag 420 is selected, the calendar discrepancy notification 406 may then be managed as one of the user-flagged notifications described in relation to FIG. 3.

Figure 5:
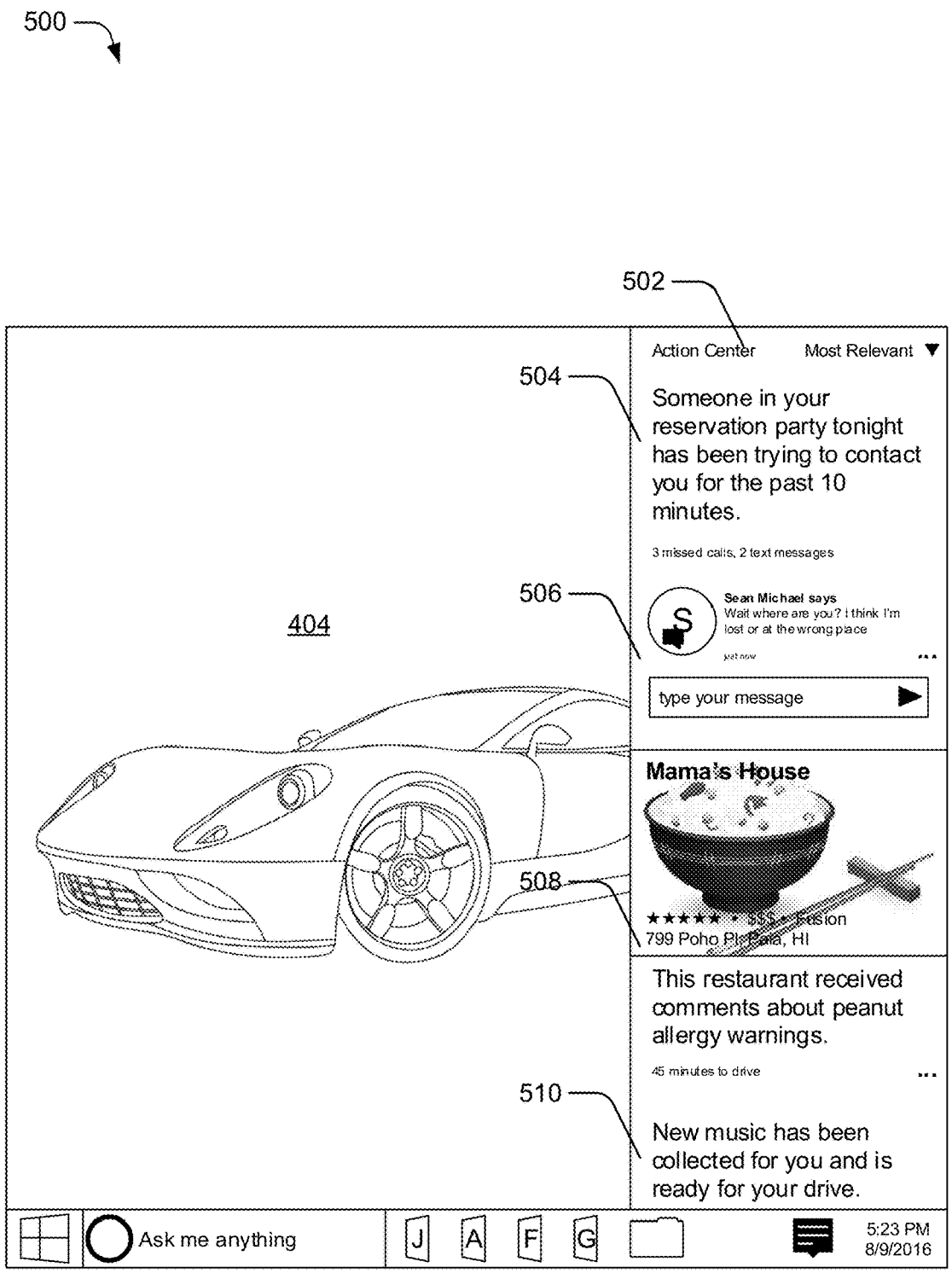
FIG. 5 illustrates an example user interface with another notification view in which notifications are filtered based on learned user preferences and behaviors in accordance with one or more implementations.

FIG. 5 depicts an example generally at 500 of a user interface with another notification view configured to present notifications that are filtered based on learned user preferences and behaviors. The user interface in this example is depicted having action center 502 which may also correspond to the notification view 130. It may simply be a notification view generated at a different time and for a different determined context than the action center 402 of FIG. 4. Like the example in FIG. 4, the action center 502 is illustrated overlaying home screen 404, which may be configured as described above. It is to be appreciated that the action center 502 may also be presented overlaying displays other than the home screen 404 as described above.

The action center 502 includes a missed communication notification 504, an instant messaging notification 506, a location review and warning 508, and a new media content notification 510. By way of example, the missed communication notification 504 may be generated by a digital assistant with access to a phone log for the computing device 102, text messages, emails, a calendar application (e.g., to know that the user has a reservation), and so forth. The instant messaging notification 506 may be generated by an instant messaging application. The location review and warning 508 may be generated by a services (e.g., restaurants, bars, and gyms) review application. The new media content notification 510 may be generated by a music service application and/or a digital assistant application that has access to information generated by a music service application (to know that the new music is collected) and also a calendar or mapping application (to know the user is driving). In accordance with the techniques herein, the digital assistant may thus leverage notifications originating from multiple different applications 110 to generate notifications that account for different events, such as media content being downloaded and driving directions determined for an upcoming drive.

The above described notifications are merely examples of the types of notifications that can be included as part of the action center 502. Furthermore, the applications described as generating the notifications of the action center 502 are also mere examples. Indeed, the notifications of the action center 502 may be generated by different application or different combinations of applications than described without departing from the spirit or scope of the techniques described herein. Additional examples and details are discussed in relation to the following example procedures.

Example Procedures

Figure 6:
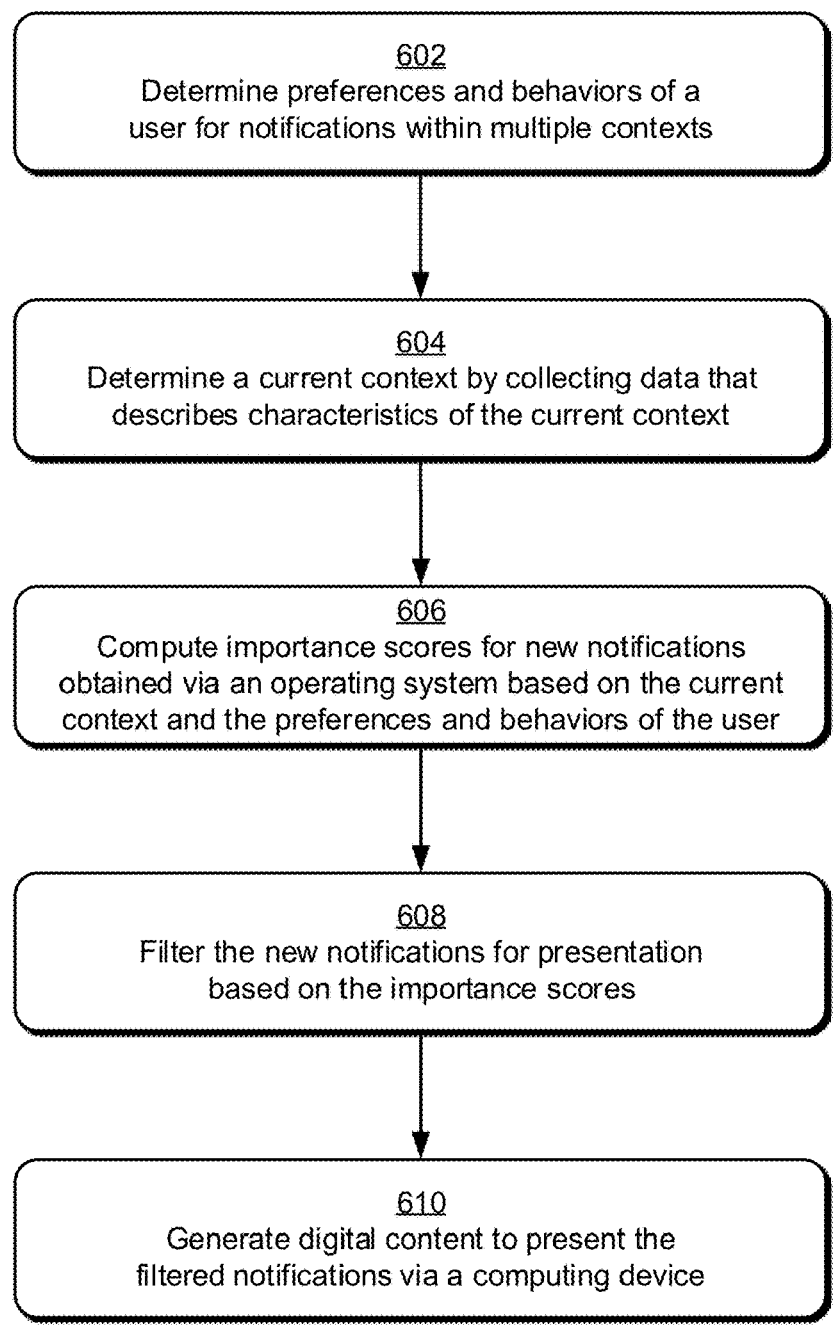
FIG. 6 is a flow diagram depicting an example procedure to filter notifications based on learned user preferences and behaviors in accordance with one or more implementations.
Figure 7:
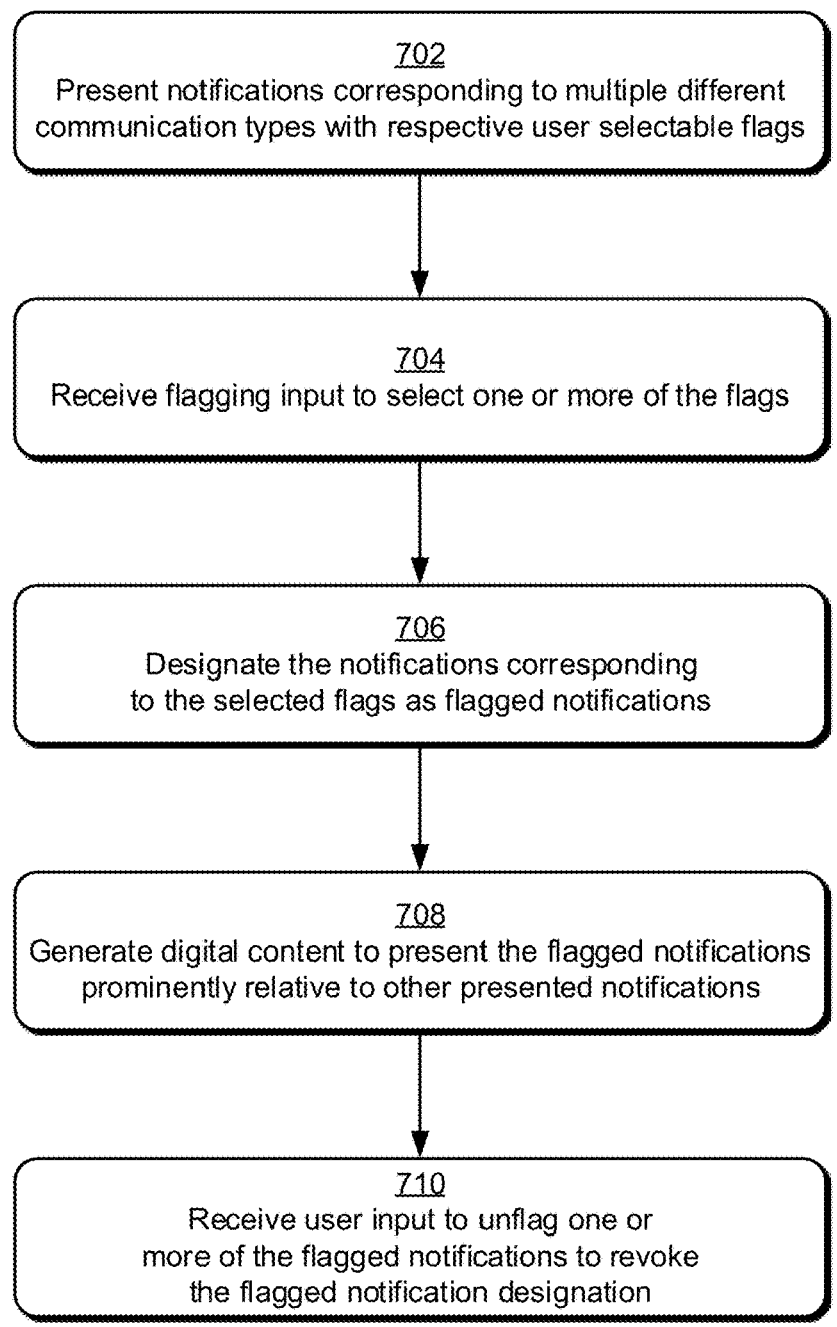
FIG. 7 is a flow diagram depicting an example procedure to present flagged notifications in accordance with one or more implementations.

Further aspects of learned user preference- and behavior-based notification filtering are discussed in relation to example procedures of FIGS. 6 and 7. The procedures are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more servers, such as via a service provider 134 that maintains and provides access to the notifications 126 across multiple devices associated with a user or otherwise. Aspects of the procedures may also be performed by a suitably configured device, such as the example computing device 102 of FIGS. 1-3 that includes or makes use of a notification manager 128.

FIG. 6 depicts an example procedure 600 for filtering notifications based on learned user preferences and behaviors in accordance with one or more implementations.

At 602, preferences and behaviors of a user are determined for interacting with notifications within multiple contexts. By way of example, the notification manager 128 monitors user interactions with notifications and with events for which notifications may be generated. Along with monitoring these user interactions, the notification manager 128 collects data that describes characteristics of the context as described above. The notification manager 128 applies machine learning techniques to the observed interactions and data describing characteristics of the context to learn preferences and behaviors of users regarding notifications. Based on this learning, the notification manager 128 computes the learned user preferences and behaviors 204. The notification manager 128 can apply these in future determined contexts to express a user's learned preferences for notifications in the determined context. The notification manager 128 updates the learned user preferences and behaviors 204 as the user continues to interact with notifications and behave in certain ways relative to events for which notifications can be generated.

At 604, a current context is determined by collecting data that describes characteristics of the current context. By way of example, the notification manager 128 determines a current context by capturing data that describes a current action or history of just-performed actions, a location of the user, a calendar of the user, a payload of a notification under consideration, engagement of the user with instrumentation of a corresponding computing device, ranked preferences of the user, a communication history of the user, a current device of the user, and so forth. In one or more implementations, the notification manager 128 generates a vector or vectors for the context having values that correspond to the collected data.

At 606, importance scores are computed for new notifications obtained via an operating system. The importance score computed for a notification is based on the current context and the preferences and behaviors of the user for notifications within the multiple contexts. By way of example, the applications 110 publish the notifications 126 to the operating system 108, such as to the published notification store 202. Given the current context determined at 604, the notification manager 128 computes importance scores for the notifications 126 of the published notification store 202. In particular, the notification manager 128 computes the importance scores using the learned user preferences and behaviors 204. By limiting the notification management to the notifications published to the operating system 108, development of a new application programming interface (API) for the applications 110 to leverage the notification manager 128's filtering can be avoided.

At 608, the new notifications are filtered for presentation based on the importance scores. By way of example, the notification manager 128 identifies a subset of the notifications 126 published to the published notification store 202 as the filtered notifications 206. The notification manager 128 does so based on the importance scores computed at 606. In one or more implementations, the filtered notifications 206 correspond to the notifications having importance scores above a predetermined threshold importance, the top-x scoring notifications (where x is a number of notifications that fits within the notification view 130), and so on.

At 610, digital content is generated to present the filtered notifications via a computing device. By way of example, the notification manager 128 generates the action center 402 to present the calendar discrepancy notification 406, the flight reminder notification 408, the battery level warning notification 410, and the instant messaging notifications 412, 414 via a display device of the computing device 102. In one or more implementations, the notification manager 128 generates a different type of presentation to present the filtered notifications 206. The notification manager 128 generates an audio presentation to present the filtered notifications 206 for instance.

FIG. 7 depicts an example procedure 700 for presenting flagged notifications in accordance with one or more implementations.

At 702, notifications corresponding to multiple different types of communications are presented with respective user selectable flags. By way of example, the notification view 130 presents notifications for communications from multiple different communication services, such as notifications for SMS text messages, emails, phone calls, social-networking service events, calendar application events, and so forth. The presented notifications are presented along with user selectable flags, such as with the flag 420 of FIG. 4.

At 704, flagging input is received to select one or more of the flags presented. By way of example, the notification manager 128 receives the flagging input 304 to select the flag 420. At 706, the notifications corresponding to the selected flags are designated as flagged notifications. By way of example, the notification manager 128 designates the calendar discrepancy notification 406 as one of the user-flagged notifications 302.

At 708, digital content is generated to present the flagged notifications prominently relative to other presented notifications. By way of example, the notification manager 128 generates a notification view in which the calendar discrepancy notification 406 is designated prominently relative to other notifications of the notification view. The notification manager 128 visually emphasizes the calendar discrepancy notification 406 relative to the other presented notifications for instance, by configuring the calendar discrepancy notification 406 with a different font, using different colors, locating the notification in a prominent position (e.g., top of the notification view), using animations, and so on.

At 710, user input to unflag one or more of the flagged notifications is received, effective to revoke the flagged notification designation of those notifications. Consider an example in which the calendar discrepancy notification 406 has been flagged and thus corresponds to one of the user-flagged notifications 302. Assume that the calendar discrepancy notification 406 is presented, as at 708. Assume also that while the calendar discrepancy notification 406 is presented, a user selects to unflag the calendar discrepancy notification 406, e.g., by providing an input (tap, click, etc.) relative to a flagged flag presented with the calendar discrepancy notification 406. Based on this input, the notification manager 128 revokes the flagged designation of the calendar discrepancy notification 406, e.g., it is no longer one of the user-flagged notifications 302. Consequently, a next time the notification manager 128 generates the notification view 130 it may not include the calendar discrepancy notification 406. In one or more implementations, the notification manager 128 configures the notification view 130 to include each of the user-flagged notifications 302. If there is any remaining room in the notification view 130, after it has been configured with the user-flagged notifications 302, the notification manager 128 may configure the remaining room of the notification view 130 to include other notifications, e.g., based on their importance scores.

Having described example procedures and details in accordance with one or more implementations, consider now a discussion of example systems and devices that can be utilized to implement the various techniques described herein.

Example System and Device

Figure 8:
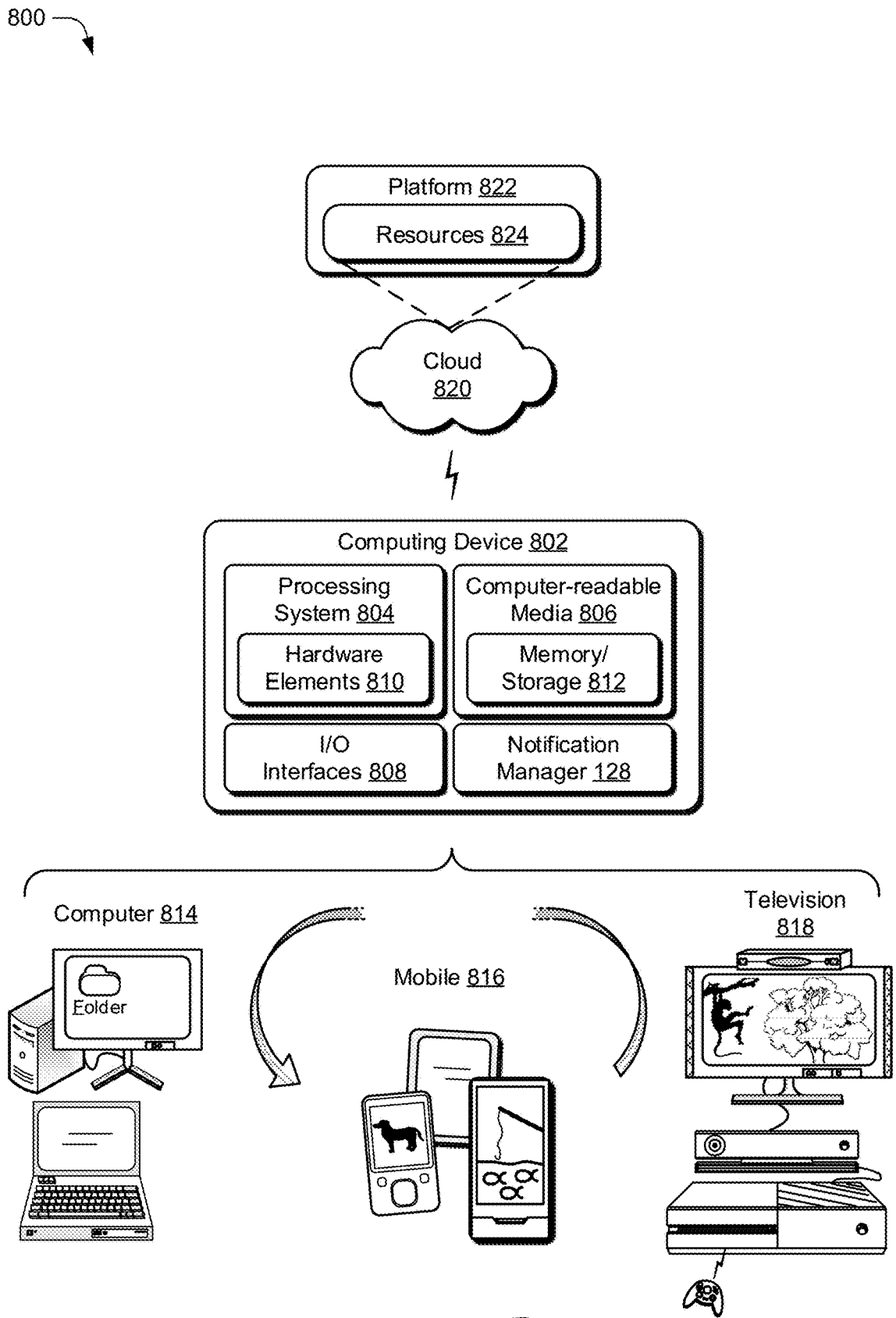
FIG. 8 illustrates an example system including various components of an example device that can be employed for one or more implementations of the techniques described herein.

FIG. 8 illustrates an example system 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, notification manager 128, and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the notification manager 128 and the notification view 130 on the computing device 802. The functionality represented by notification manager 128 and other modules/applications may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Example Implementations

Example implementations of techniques described herein include, but are not limited to, one or any combinations of the following examples:

EXAMPLE 1

A method implemented by a computing device, the method comprising: monitoring interactions of a user with notifications received from computing applications associated with the computing device, the interactions of the user within multiple contexts; determining, based on the monitoring, preferences and behaviors of the user within the multiple contexts; computing, based on a current context and the preferences and behaviors of the user within the multiple contexts, importance scores for new notifications; determining, based on the importance scores for the new notifications, which of the new notifications to present to the user; and presenting the determined new notifications to the user.

EXAMPLE 2

A method as described in example 1, further comprising: capturing context data that describes characteristics of the current context; and determining the current context based on the captured context data.

EXAMPLE 3

A method as described in example 2, wherein the context data describes a current action of the user with the computing device.

EXAMPLE 4

A method as described in example 2, wherein the context data describes a location of the user.

EXAMPLE 5

A method as described in example 2, wherein the context data describes calendar events of the user.

EXAMPLE 6

A method as described in example 2, wherein the context data describes payloads of the new notifications.

EXAMPLE 7

A method as described in example 2, wherein the context data describes engagement of the user with instrumentation of the computing device.

EXAMPLE 8

A method as described in example 1, wherein the preferences and behaviors of the user are determined using one or more machine learning techniques applied to the monitored interactions and context data describing characteristics of the multiple contexts.

EXAMPLE 9

A method as described in example 1, wherein the determined new notifications have more-favorable importance scores than at least one of the other new notifications.

EXAMPLE 10

A method as described in example 1, wherein the determined new notifications include a top scoring new notification according to the computed importance scores.

EXAMPLE 11

A method as described in example 1, further comprising generating digital content to present the determined new notifications to the user, the digital content comprising a notification view configured to display the determined new notifications via a display device.

EXAMPLE 12

A method as described in example 11, wherein the determined new notifications are presented with a graphical component that is selectable to flag a respective notification, flagged notifications being presented prominently in the notification view relative to other presented notifications, and being included in the notification view until unflagged by the user.

EXAMPLE 13

A method as described in example 1, wherein the new notifications are obtained from computer applications of multiple different computing devices associated with the user.

EXAMPLE 14

A device comprising: a processor; applications to generate notifications that provide information managed by the application; a published notification store of an operating system to maintain the notifications generated by the applications and published to the operating system; and computer-readable media having instructions stored thereon that are executable by the processor to implement a notification manager to perform operations for filtering the notifications for presentation to a user, the operations comprising: determining a current context of user interaction with the device; computing, based on the current context and learned preferences and behaviors of the user within multiple contexts, importance scores for the notifications in the published notification store; and identifying, based on the importance scores, a subset of the notifications in the published notification store to present to the user.

EXAMPLE 15

A device as described in example 14, wherein the operations further comprise obtaining the notifications in the published notification store by the notification manager without utilizing an application programming interface (API) to interface with the applications.

EXAMPLE 16

A device as described in example 15, wherein the notification manager obtains the notifications in the published notification store without interfacing directly with the applications.

EXAMPLE 17

A device as described in example 14, wherein the operations further comprise: configuring digital content to include the subset of notifications identified; and presenting the digital content via the device.

EXAMPLE 18

A method implemented by a computing device for marking notifications for follow up, the method comprising: presenting notifications that correspond to multiple different types of communication, the presented notifications presented with respective user-selectable flags; receiving flagging input to select one or more of the flags; designating the presented notifications that correspond to the selected flags as flagged notifications; and presenting the flagged notifications more prominently than other presented notifications.

EXAMPLE 19

A method as described in example 18, further comprising receiving user input to unflag one or more of the flagged notifications effective to revoke designation as the flagged notifications.

EXAMPLE 20

A method as described in example 18, wherein the multiple different types of communication include at least two of email, text messaging, phone communication, social-networking service messaging, or web-page specific messaging.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter

What is claimed is:

1. A method implemented by a computing device, the method comprising:
monitoring interactions of a user with notifications received from computing applications associated with the computing device, wherein the interactions of the user are with communications received through a plurality of modalities;
determining, based on the monitoring, preferences and behaviors of the user for interaction with the communications received through the plurality of modalities;
computing, based on a current context of the user and the determined preferences and behaviors of the user, importance scores for prioritizing notifications of new communications across the plurality of modalities; and
presenting a notification view that comprises a ranked listing of notifications across the plurality of modalities, wherein the ranked listing comprises a predetermined number notifications that exceed a threshold set for the current context of the user, and wherein the predetermined number of notifications are ordered based on the computed important scores.

2. The method of claim 1, further comprising: capturing context data that describes characteristics of the current context; and determining the current context based on the captured context data.

3. The method of claim 2, wherein the context data describes a current action of the user with the computing device.

4. The method of claim 2, wherein the context data describes a location of the user.

5. The method of claim 2, wherein the context data describes calendar events of the user.

6. The method of claim 2, wherein the context data describes payloads of the new communications.

7. The method of claim 2, wherein the captured context data describes engagement of the user with instrumentation of the computing device.

8. The method of claim 1, wherein the preferences and behaviors of the user are determined using one or more machine learning techniques applied to the monitored interactions and context data describing characteristics for interaction with the communications received through the one or more modalities.

9. The method of claim 1, wherein the presenting of the notification view further comprises presenting an indication that the plurality of notifications are notifications that have importance scores exceeding a threshold set for the current context of the user.

10. The method of claim 9, wherein the presenting presents a predetermined number of notifications exceeding the threshold set for the current context of the user.

11. The method of claim 1, further comprising: generating digital content to present in the notification view along with the ranked listing of notifications across the plurality of modalities, wherein the presenting presents the digital content in the notification view.

12. The method of claim 11, wherein the ranked listing of notifications is presented with a graphical component that is selectable to flag a type of new communication for notification, wherein a flagged type of new communication is presented prominently in the notification view relative to other presented notifications, and being included in the notification view until unflagged by the user.

13. The method of claim 1, wherein the new communications are obtained from computer applications executing across multiple different computing devices associated with the user.

14. The method of claim 1, further comprising: receiving two or more new communications, and wherein the computing is initiated based on a receipt of two or more new communications.

15. The method of claim 14, wherein the two or more new communications are received through different modalities.

16. A device comprising:
a processor;
applications to generate notifications that provide information managed by the application;
a published notification store of an operating system to maintain the notifications generated by the applications and published to the operating system; and
computer-readable media having instructions stored thereon that are executable by the processor to implement a notification manager to perform operations for filtering the notifications for presentation to a user, the operations comprising:
  monitoring interactions of a user with notifications received from computing applications associated with the device, wherein the interactions of the user are with communications received through a plurality of modalities;
  determining, based on the monitoring, preferences and behaviors of the user for interaction with the communications received through the plurality of modalities;
  computing, based on a current context of the user and the determined preferences and behaviors of the user, importance scores for prioritizing notifications of new communications across the plurality of modalities; and
  presenting a notification view that comprises a ranked listing of notifications across the plurality of modalities, wherein the ranked listing comprises a predetermined number of notifications that exceed a threshold set for the current context of the user, and wherein the predetermined number of notifications are ordered based on the computed important scores.

17. The device of claim 16, wherein the operations, executed by the processor, further comprise: filtering notifications to identify a plurality of notifications exceeding the threshold.

18. The device of claim 16, wherein the operations, executed by the processor, further comprise: receiving two or more new communications, wherein the two or more new communications are received through different modalities, and wherein the computing is initiated based on a receipt of the two or more new communications.

19. The device of claim 16, wherein the presenting of the notification view further comprises presenting an indication that the plurality of notifications are notifications that have importance scores exceeding the threshold set for the current context of the user.

20. A system comprising:
  at least one processor; and
  a memory, connected with the at least one processor, storing computer-executable instructions that, when executed by the at least one processor, causing the at least one processor to execute a method that comprises:
    monitoring interactions of a user with notifications received from computing applications associated with the system, wherein the interactions of the user are with communications received through a plurality of modalities;
    determining, based on the monitoring, preferences and behaviors of the user for interaction with the communications received through the plurality of modalities;
    computing, based on a current context of the user and the determined preferences and behaviors of the user, importance scores for prioritizing notifications of new communications across the plurality of modalities; and
    presenting a notification view that comprises a ranked listing of notifications across the plurality of modalities, wherein the ranked listing comprises a predetermined number of notifications that exceed a threshold set for the current context of the user, and wherein the predetermined number of notifications are ordered based on the computed important scores.

* * * * *